April 4, 1967  J. H. DALTRY ET AL  3,312,275
WATER COOLING SYSTEM
Filed May 6, 1966  2 Sheets-Sheet 1

John H. Daltry
Peter J. Christopher
INVENTORS

Musgrades & Douglas
ATTORNEYS

April 4, 1967    J. H. DALTRY ET AL    3,312,275
WATER COOLING SYSTEM
Filed May 6, 1966    2 Sheets-Sheet 2
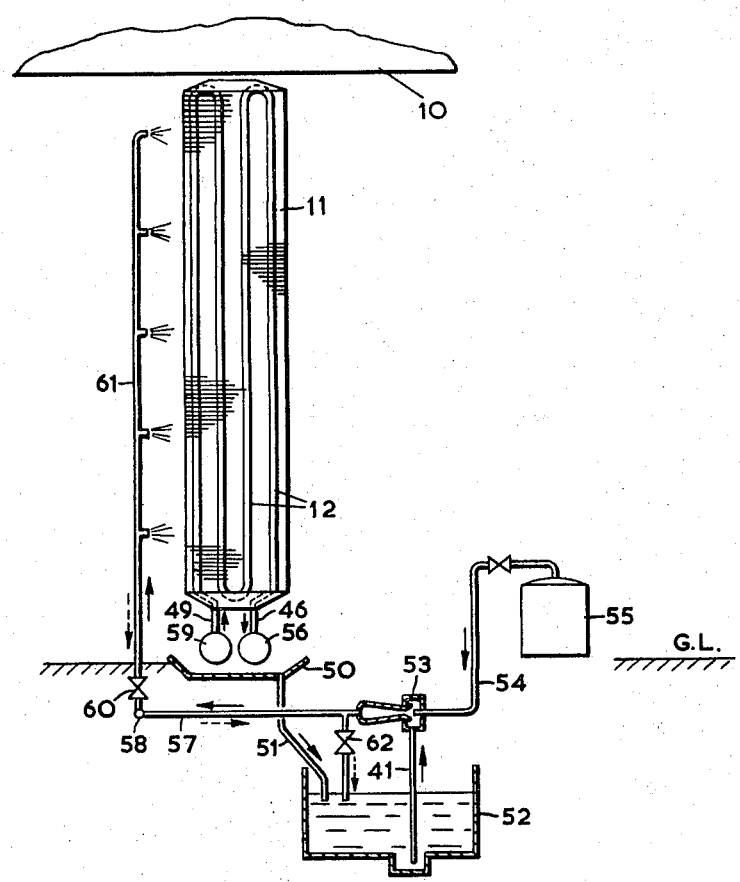
FIG. 2
FIG. 4
John H. Daltry
Peter J. Christopher
INVENTORS
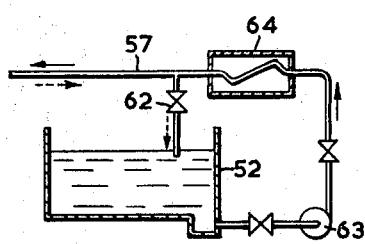
ATTORNEYS

United States Patent Office 3,312,275
Patented Apr. 4, 1967

3,312,275
WATER COOLING SYSTEM
John Harold Daltry and Peter James Christopher, both of Rugby, England, assignors to The English Electric Company Limited, London, England, a British company
Filed May 6, 1966, Ser. No. 548,205
Claims priority, application Great Britain, Feb. 9, 1961, 4,832/61
2 Claims. (Cl. 165—1)

This application is a continuation-in-part of application Ser. No. 169,349 filed Jan. 29, 1962, and now abandoned.

This invention relates to a water cooling system, for example a cooling system incorporating a dry cooling tower for cooling steam turbine condensate in extremely cold climates. A dry cooling tower is one in which a number of heat exchanger elements, for indirect heat exchange between the condensate water or other fluid, and air flowing through the said elements and up through the tower, are provided at or adjacent the base of the cooling tower.

In extremely cold climates it is necessary to provide protection against freezing of water flowing in the heat-exchanger elements. It has been proposed to achieve this by heating the incoming air: this method, however, has been found uneconomic.

An alternative method consists in heating the incoming water before filling the heat exchanger elements in cold weather, sufficiently to ensure that the outlet water temperature does not fall below a predetermined value. This is standard practice in moderate climates, but is insufficient under conditions of extreme cold.

It is an object of the present invention to provide a method of preventing freezing of water or other fluid in tube-and-fin heat exchanger elements of a cooling tower in freezing weather, without recourse to heating and incoming air. The water circulating through the tubes may still be preheated, but this is not essential to achieving the objects of the invention.

According to the invention, such a method comprises the step of applying water flowing over the external surface of said elements so as to form between the fins an ice coating in direct contact with the fins and tubes of the elements, whereby said ice coating acts both as an insulating means for the tubes, as a means for preventing normal flow of air through the elements, and as substantially the sole cooling agent for a fluid flowing in the tubes.

The applicants are aware of United States specification No. 3,012,407, which teaches a method of insulating a vessel containing very cold liquids (such as liquid oxygen) by means of a pocket of air trapped between the vessel and an ice coating formed on, for example, a wire mesh grid surrounding the vessel but spaced from it. The air pockets are necessary in such a case because the contents of the vessel would be at a much lower temperature than the ice, so that a substantial temperature gradient would be necessary between the vessel wall and the ice to prevent the ice from heating the vessel.

In the case of a cooling-tower heat exchanger element, however, water which is initially hot, and which must not be cooled to freezing point, is flowing through the tubes of the element. The air outside may be at a temperature considerably below freezing point, and this air, since it is in motion, consequently provides a means of cooling the tubes which is far too efficient.

The invention provides a means of stopping the air flow, by blocking with ice and spaces between the fins of the elements, and in addition provides in the ice an insulating medium and means for cooling the water in the tubes by a limited amount, more suitable than air for use at sub-zero temperatures.

This of course renders the cooling tower itself inoperative until the ice coating thaws off on the return of warmer weather; meanwhile the water in the tubes is cooled only by direct contact of the tubes with the ice. A state of equilibrium is set up in which a layer of melted ice exists immediately adjacent the tube, the insulating properties of the ice coating being further improved by the release of latent heat as ice at the outer boundary of this layer melts.

It is found that an ice coating formed according to the invention is sufficient to provide, on the one hand efficient insulation at substantially sub-zero ambient temperatures, and on the other hand efficient cooling of the water flowing in the tubes, whether preheated or not, without freezing of the flowing water and without necessitating any adjustment in its flow rate.

According to a preferred feature of the invention, the water for forming the ice coating is applied by spraying it onto the external surface of the heat exchanger elements.

A water cooling system according to the invention will now be described by way of example and with reference to the accompanying drawings, of which:

FIG. 2 is a partly-diagrammatic elevation showing one heat-exchanger element of the cooling tower and means for spraying water on to it to form an ice coating;

FIG. 4 shows a modification to the water spray supply circuit shown in FIG. 2.

Figure 1:
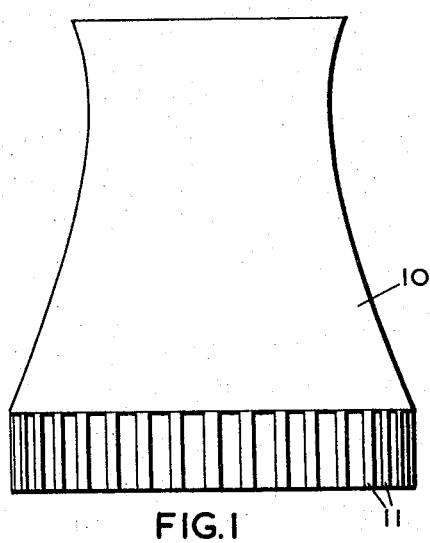
FIG. 1 is a simplified elevation of a dry cooling tower.

The cooling tower shown in FIG. 1 comprises a hollow concrete shell 10, arranged above an annular inlet at its base, in which there are arranged a number of radial tube-and-fin heat exchanger elements or coolers 11.

Figure 3:
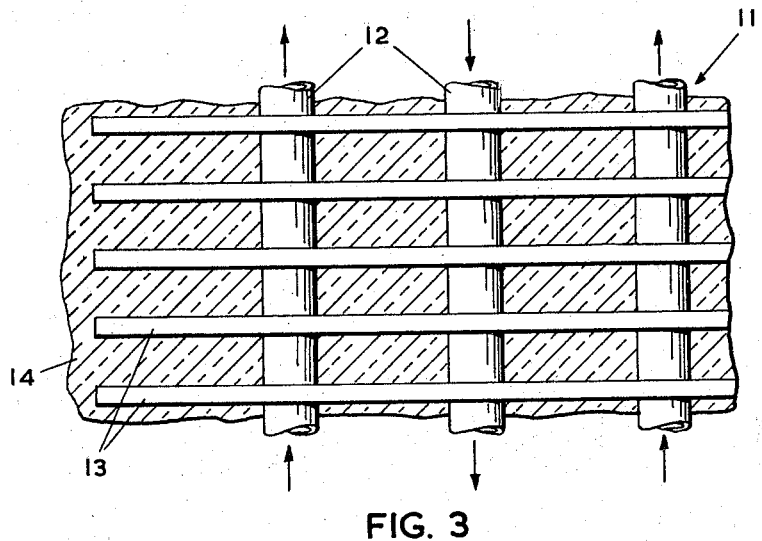
FIG. 3 is an enlarged elevation of a small portion of the element, showing the said ice coating.

Each cooler 11 comprises a number of vertical tubes 12 (FIG. 3) with horizontally-extending fins 13 attached thereto. In FIG. 2, one cooler 11 is shown end-on: only four tubes 12 are shown, although there may be many more.

Each cooler 11 is connected at the bottom, by an inlet pipe 49 and outlet pipe 46, to an inlet and an outlet main, 59, and 56 respectively, which run above a trough 50 arranged at about ground level. The trough 50 is drained through a pipe 51 to a water storage tank 52 below ground level. Water can be lifted from tank 52 through a pipe 41 and a water lifter 53, which is shown in FIG. 2 as an ejector supplied with steam through a pipe 54 from a boiler 55.

The water from tank 52 is thereby also heated before being passed through a pipe 57 to a water main 58. From there the water is passed through a spray section valve 60 to a spray header 61 for spraying water over the cooler 11. The header 61 may be drained to the water storage tank 52 through valve 60, water main 58, pipe 57 and a drain valve 62.

In operation, water condensate from an associated steam turbine plant passes from the inlet main 59, through the tubes 12 of the various coolers 11 and thence back to boiler feed pumps via the outlet main 56. At ambient temperatures above freezing, the spray headers 61 and their associated equapment are inoperative, and air is drawn through the coolers 11 to cool the water in tubes 12, and up through the cooling tower shell 10.

When the ambient temperature approaches that at which the water in at least the downstream parts of the coolers 11 is likely to begin freezing, however, the spray headers 61 are operated so as to drench the coolers 11 with water. This water penetrates between the fins 12 so as to fill the spaces between the fins with ice as it freezes. The resulting, ice coating, seen in FIG. 3 at 14, prevents any air from passing through the coolers and therefore renders the cooling tower inoperative as previously described: the water in the tubes 12 can then be cooled only by heat transfer (through the tube walls) with the ice coating 14, as has also been explained above.

When the weather becomes warmer, the ice coating 14 melts and drains through the trough 50 and pipe 51, back to the tank 52.

As has been explained, it is not essential to preheat the water for the sprays 61. FIG. 4 shows a modification by which the water may be heated or not, as desired. Water is drawn off the bottom of tank 52 by a pump 63, and pumped through a water heater 64 (which may be operative or not, as desired) into the pipe 57 leading to the main 58. In other respects this embodiment is the same as in FIG. 2.

Instead of a fixed spray header for each cooler 11, a mobile spraying plant, having for example a water tank mounted on a trailer, could be towed from one part of a cooling tower (or from one cooling tower) to another.

We claim:
1. A method for preventing internal freezing of tube-and-fin heat exchanger elements of a cooling tower in freezing weather, comprising the step of applying water flowing over the external surface of said elements so as to form between the fins an ice coating in direct contact with the fins and tubes of the elements, whereby said ice coating acts both as an insulating means for tthe tubes, as a means for preventing normal flow of air through the elements, and as substantially the sole cooling agent for a fluid flowing in the tubes.

2. A method for preventing internal freezing of tube-and-fin heat exchanger elements of a cooling tower in freezing weather, comprising the step of spraying water flowing over the external surface of said elements so as to form between the fins an ice coating in direct contact with the fins and tubes of the elements, whereby said ice coating acts both as an insulating means for the tubes, as a means for preventing normal flow of air through the elements, and as substantially the sole cooling agent for a fluid flowing in the tubes.

References Cited by the Examiner
UNITED STATES PATENTS

| | | | |
|---|---|---|---|
| 2,513,010 | 6/1950 | Deverall | 62—310 |
| 3,012,407 | 12/1961 | Burrows | 62—45 |

ROBERT A. O'LEARY, *Primary Examiner.*

C. SUKALO, *Assistant Examiner.*